United States Patent
Zhong

(10) Patent No.: US 12,330,126 B2
(45) Date of Patent: Jun. 17, 2025

(54) ULTRAFINE POWDER PARTICLE AGGREGATION AND COOLING TANK-TYPE STRUCTURE AND ULTRAFINE POWDER PARTICLE FORMING METHOD

(71) Applicant: Jiangsu Boqian New Materials Stock Co., Ltd., Jiangsu (CN)

(72) Inventor: Bi Zhong, Zhejiang (CN)

(73) Assignee: Jiangsu Boqian New Materials Stock Co., Ltd., Jiangsu (CN)

( * ) Notice: Subject to any disclaimer, the term of this patent is extended or adjusted under 35 U.S.C. 154(b) by 155 days.

(21) Appl. No.: 18/035,940

(22) PCT Filed: Sep. 3, 2021

(86) PCT No.: PCT/CN2021/116493
§ 371 (c)(1),
(2) Date: May 9, 2023

(87) PCT Pub. No.: WO2022/156224
PCT Pub. Date: Jul. 28, 2022

(65) Prior Publication Data
US 2023/0415115 A1  Dec. 28, 2023

(30) Foreign Application Priority Data

Jan. 25, 2021 (CN) .......................... 202110099342.3
Jan. 25, 2021 (CN) .......................... 202120198835.8

(51) Int. Cl.
*B01J 13/04* (2006.01)
*B01J 2/04* (2006.01)
(52) U.S. Cl.
CPC ................ *B01J 13/04* (2013.01); *B01J 2/04* (2013.01)

(58) Field of Classification Search
None
See application file for complete search history.

(56) References Cited

U.S. PATENT DOCUMENTS

| 2,422,099 A | 6/1947 | Hiller | |
| 2015/0040724 A1* | 2/2015 | Anderson | C22C 5/06 428/404 |

FOREIGN PATENT DOCUMENTS

| CN | 102615289 | 8/2012 |
| CN | 102615289 A * | 8/2012 |

(Continued)

OTHER PUBLICATIONS

"International Search Report (Form PCT/ISA/210) of PCT/CN2021/116493", mailed on Dec. 1, 2021, with English translation thereof, pp. 1-6.

(Continued)

*Primary Examiner* — Mohammad M Ameen
(74) *Attorney, Agent, or Firm* — JCIPRNET

(57) ABSTRACT

An ultrafine powder particle aggregation and cooling tank-type structure and an ultrafine powder particle forming method is provided. The tank-type structure is arranged in an ultrafine powder particle preparation system, and includes an air outlet and backflow structure, a particle forming control structure, and a tank-type variable-direction material distributing structure which are connected in sequence; a front end of the air outlet and backflow structure is connected to a front high-temperature evaporator, and a rear end of the tank-type variable-direction material distributing structure is connected to a rear collector and a cooling structure.

10 Claims, 1 Drawing Sheet

(56) References Cited

FOREIGN PATENT DOCUMENTS

| | | | |
|---|---|---|---|
| CN | 103537703 | | 1/2014 |
| CN | 203469962 | | 3/2014 |
| CN | 203469962 U | * | 3/2014 |
| CN | 104607646 | | 5/2015 |
| CN | 107745131 | | 3/2018 |
| CN | 109648093 | | 4/2019 |
| CN | 109692968 | | 4/2019 |
| CN | 112762263 | | 5/2021 |
| CN | 112891967 | | 6/2021 |
| CN | 112915919 | | 6/2021 |
| JP | 2015086413 | | 5/2015 |

OTHER PUBLICATIONS

"Written Opinion of the International Searching Authourity (Form PCT/ISA/237) of PCT/CN2021/116493", mailed on Dec. 1, 2021, pp. 1-5.
"Office Action of Taiwan Counterpart Application", issued on Mar. 3, 2023, with English translation thereof, pp. 1-10.

\* cited by examiner

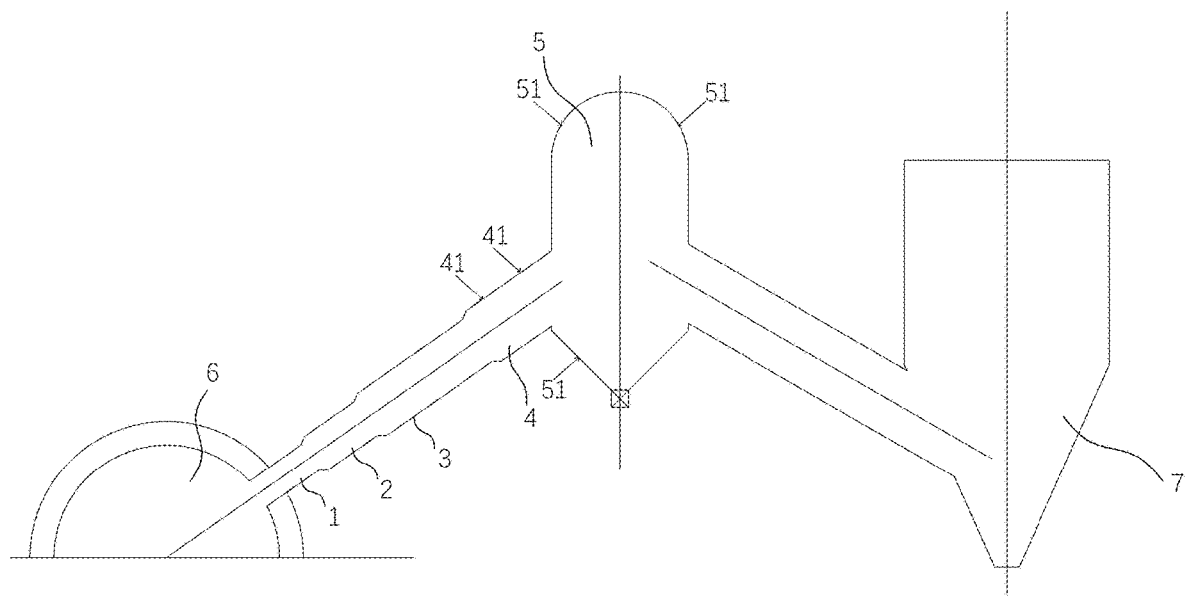

ULTRAFINE POWDER PARTICLE AGGREGATION AND COOLING TANK-TYPE STRUCTURE AND ULTRAFINE POWDER PARTICLE FORMING METHOD

CROSS-REFERENCE TO RELATED APPLICATION

This application is a 371 application of the International PCT application serial no. PCT/CN2021/116493, filed on Sep. 3, 2021, which claims the priority benefits of China application serial no. 202110099342.3 and China application serial no. 202120198835.8, both filed on Jan. 25, 2021. The entirety of each of the above-mentioned patent applications is hereby incorporated by reference herein and made a part of this specification.

BACKGROUND

Technical Field

The present invention relates to the technical field of ultrafine powder particle preparation and particularly relates to an ultrafine powder particle aggregation and cooling tank-type structure and an ultrafine powder particle forming method.

Description of Related Art

According to the forming and cooling technology for preparing ultrafine powder particles by evaporation and condensation gas phase method, the substance to be prepared is firstly heated and gasified at high temperature, and then formed post-solidification from a gaseous state and liquid state. Since the ultrafine powder particles to be prepared are microscopic materials, which are mostly nanoscale, sub-micron, or micron-sized powders, the formed particles have a small size, very high forming speed, and very high temperature, however, it is very difficult for the practical application, although the technical principle of forming is simple. It is more difficult to prepare powder particles with uniform particle size, stable morphology, and good dispersion for batch use.

Common methods include flaring the structure, slowing the vapor flow rate, and then controlling particle forming; alternatively, blowing for a cooling structure to rapidly cool the vapor. Both of these two methods have the defects of uneven temperature in the interior and outer layers of the airflow, or the defects of a non-uniform interior flow state in the interior layer caused by the air blowing and air inflow, which will lead to a large number of ultra-small and ultra-large particles to affect the subsequent use of the powder.

SUMMARY

The object of the present invention is to provide an ultrafine powder particle aggregation and cooling tank-type structure and an ultrafine powder particle forming method, so as to solve the problems existing in the prior art that a large number of ultra-small and ultra-large particles affect the subsequent use of the powder.

The present invention is achieved by the following technical solutions:
an ultrafine powder particle aggregation and cooling tank-type structure is arranged in an ultrafine powder particle preparation system, comprising an air outlet and backflow structure, a waste backflow structure or a waste collection structure, a particle forming control structure, and a tank-type variable-direction material distributing structure which are connected in sequence; a front end of the air outlet and backflow structure is connected to a front high-temperature evaporator, and a rear end of the tank-type variable-direction material distributing structure is connected to a rear collection structure;
the ultrafine powder particle preparation system further comprises a heating system arranged in the high-temperature evaporator for providing a heat source, a feeding system for providing a raw material into the high-temperature evaporator, a circulating cooling system for providing cooling, an air source or circulating air system for providing a current carrying and cooling, a pressure balancing system for providing a pressure balancing control, and an air-solid separation system or an air-solid-liquid separation system of a collection part.

Alternatively, a front end of the air outlet and backflow structure is connected to an air outlet of the high-temperature evaporator, and an interior of the air outlet and backflow structure at least comprises a first channel for the entry of high-temperature vapor; a heat preservation or heating device is provided outside of the first channel.

Alternatively, an interior of the waste backflow structure or waste collection structure at least comprises a second channel, a front end of the second channel is connected to the first channel, and a rear end of the second channel is connected to an interior cavity of the particle forming control structure; a heat preservation or heating device is provided outside of the second channel.

Alternatively, a front end of the interior cavity of the particle forming control structure is connected to the second channel, and a rear end of the interior cavity is connected to an air intake duct of an air injection cooling structure or the tank-type variable-direction material distributing structure, and an ultrafine powder particle forming region is arranged inside the interior cavity, and a heat preservation or warming or cooling structure is arranged inside the particle forming control structure, wherein a temperature of the ultrafine powder particle forming region is indirectly controlled by heat conduction or heat radiation, a velocity of particles passing through the ultrafine powder particle forming region with a current-carrying air is controlled by a velocity of the current-carrying air and a cross-sectional size of the ultrafine powder particle forming region.

Alternatively, the air injection cooling structure for precooling the formed particles is provided between the particle forming control structure and the tank-type variable-direction material distributing structure, wherein the air injection cooling structure at least comprises an interior third channel, a front end of the third channel is communicated with the ultrafine powder particle forming region, a rear end of the third channel is connected to the tank-type variable-direction material distributing structure, and a porous interior layer plate is provided outside the third channel so as to uniformly inject cooling air into the third channel from the periphery.

Alternatively, the tank-type variable-direction material distributing structure comprises a variable-direction tank-type cavity, and an air intake duct and an air outlet duct are connected to the variable-direction tank-type cavity, wherein the air intake duct is connected to the third channel or the particle forming control structure, and the air outlet duct is connected to the collection structure;

an interior layer heat preservation structure or cooling structure is arranged inside the air intake duct and the air outlet duct;

an included angle between an axial center line of the air intake duct and an axial center line of the air outlet duct is 30-150°.

Alternatively, a relationship between a volume V of the variable-direction tank-type cavity and an interior cross-sectional area S1 of an air intake port is as follows:

V/S1>100, wherein a unit of V is cubic centimeters, and a unit of S1 is square centimeters.

Alternatively, one or more cooling fluid inlets are provided on the variable-direction tank-type cavity, a cooling fluid is air or liquid, and the cooling fluid enters the variable-direction tank-type cavity through the cooling fluid inlet to mix and cool the current-carrying air and a powder passing through the variable-direction tank-type cavity.

An ultrafine powder particle aggregation and cooling tank-type structure forming method using the ultrafine powder particle aggregation and cooling tank-type structure according to the disclosure comprises the following steps:

(S1) adding a material to be prepared into an ultrafine powder particle in the high-temperature evaporator, mixing a heated and evaporated material vapor with a current-carrying air to form a mixed air, and then entering the air outlet and backflow structure from an outlet port of the high-temperature evaporator, and controlling an interior temperature of the air outlet and backflow structure to be higher than a melting point of the material to be prepared by heat preservation or heating;

(S2) the mixed air entering the particle forming control structure after passing through the air outlet and backflow structure, the waste backflow structure, or the waste collection structure; in the ultrafine powder particle forming region of the particle forming control structure, indirectly controlling the temperature of each part of the ultrafine powder particle forming region by heat conduction or heat radiation through a heat preservation structure or a heating structure or a cooling structure, controlling the velocity of the particles passing through each interior region with the current-carrying air through the velocity of the current-carrying air and a cross-sectional size of the duct, thus providing stable and controllable conditions for particle forming, so that a substance to be prepared changes from a gaseous state to a liquid state, and changes from the liquid state to a solid state; the gaseous state substance collides with each other and condenses into smaller liquid cores, which collide with each other into larger droplets or the gaseous state substance collides with the smaller liquid cores into larger droplets, the larger droplets continue to collide with each other to grow or solidify into solid particles, the smaller liquid cores combine with the solid particles into larger solid particles or into a core-shell structure, the gaseous state particles combine and the solid particles into larger solid particles or into a core-shell structure, and the solid particles continue to cool, thereby preparing particles with a desired particle size and morphology;

(S3) The particles with the desired particle size and morphology prepared in step S2 directly entering the tank-type variable-direction material distributing structure under the carrying of the current-carrying air, separating poor product particles in the particles from good product particles, wherein the good product particles move to the next process under the carrying of the current-carrying air, and the poor product particles converge to the waste backflow structure or the waste collection structure; and (S4) the good product particles entering the collection structure under the current-carrying air, separating the formed ultrafine powder particles from the current-carrying air, wherein the ultrafine powder particles are collected as a product, and the current-carrying air is discharged or recycled.

Alternatively, the particles with desired particle size and morphology prepared in step S2 enter the interior of the air injection cooling structure carried by the current-carrying air, the cooling air is uniformly injected into an interior channel from the periphery through the porous interior layer plate, and the particles enter the tank-type variable-direction material distributing structure after mixing and cooling with an entering high-temperature air and the formed particles.

The present invention has the following beneficial effects:

According to this patent, each stage in the ultrafine powder particle forming process is precisely controlled through a specific structure, including temperature field control, speed field control and connection control among structures, Usage that steam flowing inside the structure uniformly passes through each controlled part, thus providing stable and controllable conditions for the formation of ultrafine powder particles, with uniform particle size, stable morphology, and good dispersion.

BRIEF DESCRIPTION OF THE DRAWINGS

FIGURE is a schematic structural diagram of an ultrafine powder particle aggregation and cooling tank-type structure of the present invention.

REFERENCE NUMERALS

1. Air outlet and backflow structure, 2. Waste backflow structure or waste collection structure, 3. Particle forming control structure, 4. Air injection cooling structure, 41. Air injection at the air injection cooling structure, 5. Tank-type variable-direction material distributing structure, 51. Cooling fluid inlet, 6. Interior cavity in a high-temperature evaporator, 7. Collector.

DESCRIPTION OF THE EMBODIMENTS

The technical solutions of the present invention are described in detail by the following examples, which are merely exemplary and can be used to explain and illustrate the technical solutions of the present invention, but should not be construed as limiting the technical solutions of the present invention.

In the description of the present invention, it should be noted that orientations or position relationships indicated by terms “center”, “top”, “bottom”, “left”, “right”, “front”, “rear”, “vertical”, “horizontal”, etc. are orientation or position relationships as shown in the drawings, and these terms are just used to facilitate description of the present invention and simplify the description, but not to indicate or imply that the mentioned device or elements must have a specific orientation and must be established and operated in a specific orientation, and thus, these terms cannot be understood as a limitation to the present invention; furthermore, the terms “first,” “second,” and “third” are used for descriptive purposes only and are not to be construed as indicating or implying relative importance.

In the descriptions of the present invention, it should be noted that, unless otherwise specified and defined explicitly, the terms "mounted", "interconnected", and "connected" are to be interpreted broadly, for example, may be fixedly connected, or detachably connected, or integrally connected; may be mechanically connected, or also be electrically connected; may be directly connected, or also be indirectly connected through an intermediate medium, or also be internally communicated between two elements. A person of ordinary skill in the art can understand specific meanings of these terms in the present invention based on specific situations.

The present structure is used to prepare ultrafine powders, including but not limited to metal ultrafine powders. In the following examples, the preparation of metal ultrafine powder is exemplified, but the present structure is not limited to the preparation of metal ultrafine powder.

When preparing nano-sized, sub-micron-sized, or micron-sized micro-sized particle powder by evaporation and condensation air phase method, a particle aggregation and cooling tank-type structure and a particle forming method are used, wherein the particle aggregation and cooling tank-type type structure is a channel, in which the connection mode of each interface is designed to connect each part; each stage in the ultrafine powder particle forming process is precisely controlled through a specific structure, including temperature field control, speed field control and connection control among structures, so that steam flowing inside the structure uniformly passes through each controlled part, thus providing stable and controllable conditions for the formation of ultrafine powder particles. The substance to be prepared changes from a gaseous state to a liquid state, and changes from the liquid state to a solid state; the gaseous state substance collides with each other and condenses into smaller liquid cores, which collide with each other into larger droplets or the gaseous state substance collides with the smaller liquid cores into larger droplets, the larger droplets continue to collide with each other to grow or solidify into solid particles, the smaller liquid cores combine with the solid particles into larger solid particles or into a core-shell structure, the gaseous state particles combine and the solid particles into larger solid particles or into a core-shell structure, and the solid particles continue to cool, thereby preparing particles with a desired particle size and morphology; The formed particles have a uniform particle size, stable morphology, and good dispersion.

As shown in FIGURE, the present application provides an ultrafine powder particle aggregation and cooling tank-type structure, which is arranged in an ultrafine powder particle preparation system. In the present application, the ultrafine powder particle preparation system further comprises a heating system arranged in the high-temperature evaporator for providing a heat source, a feeding system for providing into the high-temperature evaporator, a circulating cooling system for providing cooling, an air source or circulating air system for providing a current carrying and cooling, a pressure balancing system for providing a pressure balancing control, and an air-solid separation system or an air-solid-liquid separation system of a collection part. All of the above-mentioned parts are prior art, and the connection relationship or structure thereof is not improved in the present application, therefore, a detailed description will not be given in the present application, and all can be obtained from the prior patent documents.

The focus of the present application is an aggregation and cooling tank-type structure arranged between a high-temperature evaporator and a collection structure, comprising an air outlet and backflow structure 1, a waste backflow structure or a waste collection structure 2, a particle forming control structure 3 and a tank-type variable-direction material distributing structure 5 which are connected in sequence.

Wherein a front end of the air outlet and backflow structure 1 is connected to the air outlet of the front high-temperature evaporator and a rear end of the tank-type variable-direction material distributing structure 5 is connected to the rear collection structure.

An interior of the air outlet and backflow structure 1 at least comprises a first channel for the entry of high-temperature vapor, and a housing of the air outlet and backflow structure 1 is arranged outside the first channel. A heat preservation structure is provided between the first channel and the housing of the air outlet and backflow structure 1, and a reinforcement structure or a heating device is provided outside the first channel. The housing of the air outlet and backflow structure 1 is a jacket structure, and a circulating cooling liquid passes through the interior of the jacket structure. The first channel is made of a material that does not physically or/and chemically react with the material to be prepared. The temperature inside the air outlet and backflow structure 1 is controlled to be higher than the melting point of the ultrafine powder particle material to be prepared by heat preservation or heating.

Provided is a waste backflow structure or waste collection structure 2, the interior of the waste backflow structure or waste collection structure 2 at least comprises a second channel. A front end of the second channel is connected to the first channel, and a rear end of the second channel is connected to an interior cavity of the particle forming control structure 3. While ensuring the passage of air, the waste in the upper duct or channel is melted into liquid and flows back, or the waste in the upper duct or channel is collected into the waste retention storage barrel, so as to prevent the passage of air in the channel from being obstructed. A heat preservation or heating device is provided outside the second channel, and the temperature inside the waste backflow structure is controlled to be higher than the melting point of the material to be prepared by the heat preservation or heating device, or the temperature inside the ventilation channel of the waste collection structure is controlled to be higher than the melting point of the material to be prepared, and the temperature inside the waste retention storage barrel is controlled to be lower than the melting point of the material to be prepared.

A front end of the interior cavity of the particle forming control structure 3 is connected to the second channel, and a rear end of the interior cavity is connected to an air intake duct of an air injection cooling structure 4 or the tank-type variable-direction material distributing structure 5, and an ultrafine powder particle forming region is arranged inside the interior cavity. The ultrafine powder particle forming region is a channel structure, which is the main site for particle forming control. A heat preservation or heating or cooling structure is arranged inside the particle forming control structure 3, wherein the temperature of the ultrafine powder particle forming region is indirectly controlled by heat conduction or heat radiation, the velocity of particles passing through the ultrafine powder particle forming region with the current-carrying air is controlled by the velocity of the current-carrying air and the cross-sectional size of the particle forming region, so as to provide stable and controllable conditions for particle forming.

The particle forming control structure 3 comprises a housing structure, an intermediate heat preservation layer, and an interior heat conduction layer.

The housing structure is a jacket structure, in which a coolant is circulated.

The intermediate heat preservation layer is a single layer or a multi-layer structure.

The interior heat conduction layer forms a channel subjected to a heat preservation treatment, namely, an ultrafine powder particle forming region, for indirectly controlling the temperature of the substance circulating in the channel by heat conduction or heat radiation.

In the particle forming control structure 3, the substance to be prepared changes from a gaseous state to a liquid state, and changes from the liquid state to a solid state; the gaseous state substance collides with each other and condenses into smaller liquid cores, which collide with each other into larger droplets or the gaseous state substance collides with the smaller liquid cores into larger droplets, the larger droplets continue to collide with each other to grow or solidify into solid particles, the smaller liquid cores combine with the solid particles into larger solid particles or into a core-shell structure, the gaseous state particles combine and the solid particles into larger solid particles or into a core-shell structure, and the solid particles continue to cool, thereby preparing particles with a desired particle size and morphology. In this application, a smaller liquid core is merely a relative concept and does not refer to a specific size, and likewise, a larger liquid droplet is a relative concept other than a specific size. Thus, the above-described references to larger and smaller are not to be construed as unclear, but rather as relating to interior variations of the molecule and are intended to be used literally, the larger and smaller hereinafter being understood as such.

An air injection cooling structure 4 for pre-cooling the formed particles can be mounted between the particle forming control structure 3 and the tank-type variable-direction material distributing structure 5. The air injection cooling structure 4 at least comprises an interior third channel, a front end of the third channel is communicated with the ultrafine powder particle forming region, and a rear end of the third channel is connected to the tank-type variable-direction material distributing structure 5. A porous interior layer plate is arranged in the third channel, so that cooling air is uniformly injected into the third channel from the periphery, thus preventing the occurrence of soft agglomeration or hard agglomeration when the formed particles are agglomerated due to a higher temperature.

The tank-type variable-direction material distributing structure comprises a variable-direction tank-type cavity, and an air intake duct and an air outlet duct are connected to the variable-direction tank-type cavity, wherein the air intake duct is connected to the third channel or the particle forming control structure, and the air outlet duct is connected to the collection structure. An included angle between the axial center line of the air intake duct and the axial center line of the air outlet duct is 30-150°.

The present application also provides an ultrafine powder particle forming method using the ultrafine powder particle aggregation and cooling pipe tank-type structure of the present disclosure, comprising the following steps:
- (S1) adding a material to be prepared into an ultrafine powder particle in a high-temperature evaporator, mixing the heated and evaporated material vapor with a current-carrying air to form a mixed air, and then entering an air outlet and backflow structure from an outlet port of the high-temperature evaporator, and controlling the interior temperature of the air outlet and backflow structure to be higher than the melting point of the material to be prepared by heat preservation or heating;
- (S2) the mixed air entering a particle forming control structure after passing through an air outlet and backflow structure, a waste backflow structure or a waste collection structure; in the ultrafine powder particle forming region of the particle forming control structure, indirectly controlling the temperature of each part of the ultrafine powder particle forming region by heat conduction or heat radiation through a heat preservation structure or a heating structure or a cooling structure, controlling the velocity of the particles passing through each interior region with the current-carrying air through the velocity of the current-carrying air and the cross-sectional size of the duct, thus providing stable and controllable conditions for particle forming, so that the substance to be prepared changes from a gaseous state to a liquid state, and changes from the liquid state to a solid state; the gaseous state substance collides with each other and condenses into smaller liquid cores, which collide with each other into larger droplets or the gaseous state substance collides with the smaller liquid cores into larger droplets, the larger droplets continue to collide with each other to grow or solidify into solid particles, the smaller liquid cores combine with the solid particles into larger solid particles or into a core-shell structure, the gaseous state particles combine and the solid particles into larger solid particles or into a core-shell structure, and the solid particles continue to cool, thereby preparing particles with a desired particle size and morphology;
- (S3) the particles with the desired particle size and morphology prepared in step S2 directly entering the tank-type variable-direction material distributing structure under the carrying of the current-carrying air, separating poor product particles in the particles from good product particles, wherein the good product particles move to the next process under the carrying of the current-carrying air, and the poor product particles converge to the waste backflow structure or the waste collection structure; and
- (S4) the good product particles entering the collection structure under the current-carrying air, separating the formed ultrafine powder particles from the current-carrying air, wherein the ultrafine powder particles are collected as a product, and the current-carrying air is discharged or recycled.

Alternatively, the particles with desired particle size and morphology prepared in step S2 enter the interior of the air injection cooling structure carried by the current-carrying air, the cooling air is uniformly injected into the interior channel from the periphery through the porous interior layer plate, and the particles enter the variable-direction material distributing structure after mixing and cooling with the entering high-temperature air and the formed particles.

The relationship between the volume V of the variable-direction tank-type cavity of the tank-type variable-direction material distributing structure and the interior cross-sectional area S1 of the air intake port is as follows:

V/S1>100; wherein V is a volume measured in cubic centimeters; S1 is an internal cross-sectional area measured in square centimeters.

One or more cooling fluid inlets are provided on the variable-direction tank-type cavity of the tank-type variable-direction material distributing structure, the cooling fluid is air or liquid, and the cooling fluid enters the variable-direction tank-type cavity through the cooling fluid inlet to mix and cool the current-carrying air and the powder passing through the variable-direction tank-type cavity.

The aggregation and cooling formed particles are collected as products and the current-carrying air is vented or recycled.

By fitting and connecting the above-mentioned structures together with a front high-temperature evaporator, a rear collection and cooling structure, a heating system for providing a heat source in the high-temperature evaporator, a feeding system for providing a raw material in the front high-temperature evaporator, a circulating cooling system for providing cooling, an air source or circulating air system for providing a current carrying and cooling, a pressure balancing system for providing a pressure balancing control, and an air-solid separation system or an air-solid-liquid separation system for a collection part, a continuous circulating industrial production process for particle aggregation and cooling forming is completed, and a nanoscale, submicron or micron-sized powder with a uniform particle size, a stable morphology, and a good dispersion is prepared.

Although the examples of the present invention have been illustrated and described, it should be understood that those of ordinary skill in the art may make various changes, modifications, replacements, and variations to the above examples without departing from the principle and spirit of the present invention, and the scope of the present invention is limited by the appended claims and their legal equivalents.

What is claimed is:

1. An ultrafine powder particle aggregation and cooling tank-type structure, the structure is arranged in an ultrafine powder particle preparation system and comprising an air outlet and backflow structure, a waste backflow structure, or a waste collection structure, a particle forming control structure, and a tank-type variable-direction material distributing structure which are connected in sequence;
    a front end of the air outlet and backflow structure is connected to a front high-temperature evaporator, and a rear end of the tank-type variable-direction material distributing structure is connected to a rear collection structure;
    the ultrafine powder particle preparation system further comprises a heating system arranged in the high-temperature evaporator for providing a heat source, a feeding system for providing a raw material into the high-temperature evaporator, a circulating cooling system for providing cooling, an air source or circulating air system for providing a current carrying and cooling, a pressure balancing system for providing a pressure balancing control, and an air-solid separation system or an air-solid-liquid separation system of a collection part.

2. The ultrafine powder particle aggregation and cooling tank-type structure according to claim 1, wherein the front end of the air outlet and backflow structure is connected to an air outlet of the high-temperature evaporator, and an interior of the air outlet and backflow structure at least comprises a first channel for entry of high-temperature vapor; a heat preservation or heating device is provided outside of the first channel.

3. The ultrafine powder particle aggregation and cooling tank-type structure according to claim 2, wherein an interior of the waste backflow structure or waste collection structure at least comprises a second channel, a front end of the second channel is connected to the first channel, and a rear end of the second channel is connected to an interior cavity of the particle forming control structure; a heat preservation or heating device is provided outside of the second channel.

4. The ultrafine powder particle aggregation and cooling tank-type structure according to claim 3, wherein a front end of the interior cavity of the particle forming control structure is connected to the second channel, and a rear end of the interior cavity is connected to an air intake duct of an air injection cooling structure or the tank-type variable-direction material distributing structure, and an ultrafine powder particle forming region is arranged inside the interior cavity, and a heat preservation or warming or cooling structure is arranged inside the particle forming control structure, wherein a temperature of the ultrafine powder particle forming region is indirectly controlled by heat conduction or heat radiation, a velocity of particles passing through the ultrafine powder particle forming region with a current-carrying air is controlled by a velocity of the current-carrying air and a cross-sectional size of the ultrafine powder particle forming region.

5. The ultrafine powder particle aggregation and cooling tank-type structure according to claim 4, wherein the air injection cooling structure for pre-cooling the formed particles is provided between the particle forming control structure and the tank-type variable-direction material distributing structure, wherein the air injection cooling structure at least comprises an interior third channel, a front end of the third channel is communicated with the ultrafine powder particle forming region, a rear end of the third channel is connected to the tank-type variable-direction material distributing structure, and a porous interior layer plate is provided outside the third channel so as to uniformly inject cooling air into the third channel from a periphery.

6. The ultrafine powder particle aggregation and cooling tank-type structure according to claim 5, wherein the tank-type variable-direction material distributing structure comprises a variable-direction tank-type cavity, and an air intake duct and an air outlet duct are connected to the variable-direction tank-type cavity, wherein the air intake duct is connected to the third channel or the particle forming control structure, and the air outlet duct is connected to the collection structure;
    an interior layer heat preservation structure or cooling structure is arranged inside the air intake duct and the air outlet duct;
    an included angle between an axial center line of the air intake duct and an axial center line of the air outlet duct is 30-150°.

7. The ultrafine powder particle aggregation and cooling tank-type structure according to claim 6, wherein a relationship between a volume V of the variable-direction tank-type cavity and an interior cross-sectional area S1 of an air intake port is as follows:
    $V/S1>100$, wherein a unit of V is cubic centimeters, and a unit of S1 is square centimeters.

8. The ultrafine powder particle aggregation and cooling tank-type structure according to claim 6, wherein one or more cooling fluid inlets are provided on the variable-direction tank-type cavity, a cooling fluid is air or liquid, and the cooling fluid enters the variable-direction tank-type cavity through the cooling fluid inlet to mix and cool the current-carrying air and a powder passing through the variable-direction tank-type cavity.

9. An ultrafine powder particle aggregation and cooling tank-type structure forming method using the ultrafine powder particle aggregation and cooling tank-type structure according to claim 1, comprising the following steps:

(S1) adding a material to be prepared into an ultrafine powder particle in the high-temperature evaporator, mixing a heated and evaporated material vapor with a current-carrying air to form a mixed air, and then entering the air outlet and backflow structure from an outlet port of the high-temperature evaporator, and controlling an interior temperature of the air outlet and backflow structure to be higher than a melting point of the material to be prepared by heat preservation or heating;

(S2) the mixed air entering the particle forming control structure after passing through the air outlet and backflow structure, the waste backflow structure, or the waste collection structure; in an ultrafine powder particle forming region of the particle forming control structure, indirectly controlling a temperature of each part of the ultrafine powder particle forming region by heat conduction or heat radiation through a heat preservation structure or a heating structure or a cooling structure, controlling a velocity of the particles passing through each interior region with the current-carrying air through a velocity of the current-carrying air and a cross-sectional size of a duct, thus providing stable and controllable conditions for particle forming, so that a substance to be prepared changes from a gaseous state to a liquid state, and changes from the liquid state to a solid state; the gaseous state substance collides with each other and condenses into smaller liquid cores, which collide with each other into larger droplets or the gaseous state substance collides with the smaller liquid cores into larger droplets, the larger droplets continue to collide with each other to grow or solidify into solid particles, the smaller liquid cores combine with the solid particles into larger solid particles or into a core-shell structure, the gaseous state particles combine and the solid particles into larger solid particles or into a core-shell structure, and the solid particles continue to cool, thereby preparing particles with a desired particle size and morphology;

(S3) the particles with the desired particle size and morphology prepared in step S2 directly entering the tank-type variable-direction material distributing structure under a carrying of the current-carrying air, separating poor product particles in the particles from good product particles, wherein the good product particles move to a next process under the carrying of the current-carrying air, and the poor product particles converge to the waste backflow structure or the waste collection structure; and (S4) the good product particles entering the collection structure under the current-carrying air, separating the formed ultrafine powder particles from the current-carrying air, wherein the ultrafine powder particles are collected as a product, and the current-carrying air is discharged or recycled.

10. The ultrafine powder particle aggregation and cooling tank-type structure forming method according to claim 9, wherein the particles with the desired particle size and morphology prepared in step S2 enter an interior of an air injection cooling structure carried by the current-carrying air, a cooling air is uniformly injected into an interior channel from a periphery through a porous interior layer plate, and the particles enter the tank-type variable-direction material distributing structure after mixing and cooling with an entering high-temperature air and the formed particles.

* * * * *